(12) United States Patent
Tosaki et al.

(10) Patent No.: US 6,312,335 B1
(45) Date of Patent: *Nov. 6, 2001

(54) INPUT DEVICE, GAME DEVICE, AND METHOD AND RECORDING MEDIUM FOR SAME

(75) Inventors: Kenji Tosaki; Atsunori Himoto; Akitoshi Oikawa; Hisamichi Sugahara, all of Tokyo (JP)

(73) Assignee: Kabushiki Kaisha Sega Enterprises, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,223

(22) Filed: Jan. 23, 1998

(30) Foreign Application Priority Data

Jan. 30, 1997 (JP) .................................................. 9-017223

(51) Int. Cl.⁷ .................................................. A63F 13/06
(52) U.S. Cl. .......................................... 463/37; 273/148 B
(58) Field of Search .......................... 463/37; 273/148 B, 273/438; 242/84.5, 21, 223–249, 253–255; 700/90; 340/710; 514/363; 345/164; 972/73; 434/69; 364/410; 272/1 R; 33/719

(56) References Cited

U.S. PATENT DOCUMENTS

| 2,150,088 | * | 3/1939 | White | 242/84.5 |
| 4,695,953 | * | 9/1987 | Blair et al. | 700/90 |
| 5,203,563 | * | 4/1993 | Loper, III | 273/148 B |
| 5,232,223 | * | 8/1993 | Dornbusch | 463/37 |
| 5,516,105 | * | 5/1996 | Eisenbrey et al. | 273/148 B |
| 5,713,792 | * | 2/1998 | Ohzono et al. | 436/37 |
| 5,730,655 | * | 3/1998 | Meredith | 273/148 B |

* cited by examiner

Primary Examiner—Valencia Martin-Wallace
Assistant Examiner—Julie Kasick
(74) Attorney, Agent, or Firm—Finnegan, Henderson, Farabow, Garrett & Dunner, L.L.P.

(57) ABSTRACT

An input device in which a player moves the whole of the input device and a game processing device for processing a simulated game are disclosed. The input device is modeled on an instrument required for a prescribed action in real-life. The input device includes detecting means for detecting physical quantities corresponding to the movement of the input device as a whole and converting the physical quantities to a detection signal which is output. The input device further includes vibration transmitting means, fixed to the casing of the input device so that vibration is transmitted to the input device, for inducing mechanical displacement corresponding to prescribed instruction signals. The game processing device includes game developing means for developing a game simulating the real-life action and for providing a display indicating that the instrument has received an impact at a time during the game corresponding to a time when the instrument would receive an impact during the real-life action. The game processing device further includes instruction means for outputting an instruction signal to the input device indicating that the impact has been received at a time during the game corresponding to a time when the impact would be received. When movement information indicating the movement of the input device and supplied by the input device reaches a prescribed condition, the development of the game by said game developing means is changed.

6 Claims, 9 Drawing Sheets

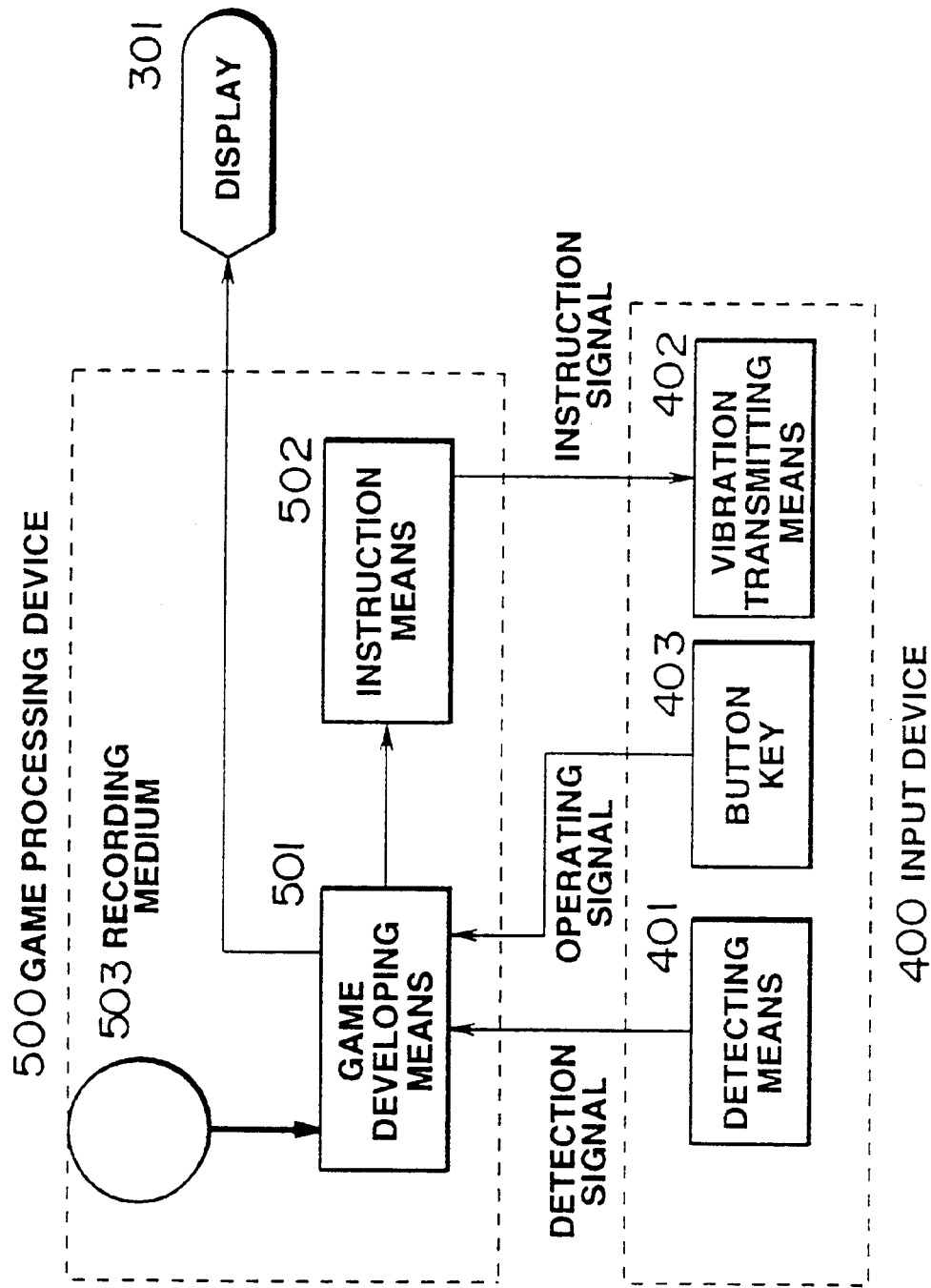

INPUT DEVICE, GAME DEVICE, AND METHOD AND RECORDING MEDIUM FOR SAME

BACKGROUND OF THE INVENTION

1. Field of the Invention

The present invention relates to an input device used in a game which simulates fishing, or the like, and more particularly, to an input device and processing technology for same which simulates a fishing rod, or the like, without the mechanical constraints associated with a fishing line, or the like.

2. Description of the Related Art

Game devices known as "fishing games" have been manufactured commercially in amusement arcades, and hence they have a large casing. The overall shape of this type of game device is modeled on the deck of a boat, and it is provided with an input device resembling an actual fishing rod. A fishing line hangs down from the end of the fishing rod and the end of this line is connected to means for detecting the tension in the fishing line or a device which applies tension to the fishing line. A large display is provided on the front face of the input device.

During the game, the player watches an image of sea-fishing shown on a display in front of the fishing rod. The player operates the input device modelled on a fishing rod and senses a "bite" (when the fish is caught or touches the food) by means of the tension applied to the rod, or by a sudden pull on the rod. In other words, when there is a "bite", this is indicated to the player by applying tension to the fishing rod. To reel the fish in, the player raises the input device and winds in the fishing line by means of a reel, and the game device processes the game by detecting the amount of line reeled in and the tension in the line.

The game device described above is in commercial use, and since it has a relatively large casing, it is simple to provide an input device modeled on a fishing rod and a device for applying tension to the fishing rod, or the like.

However, this commercial game device is too large to apply to a domestic game device, and this leads to increased costs.

Moreover, if there are mechanical constraints due to the fishing line etc., is it not possible to provide the action of casting the line, which is a characteristic action in actual fishing.

Therefore, if a fishing game or the like is implemented in a domestic game device, it is necessary to remove the mechanical constraints of the fishing line, etc. and to detect complex movements applied to the fishing rod, and the like.

Furthermore, by detecting the movement of an input device simulating a bat or a golf club, instead of a fishing rod, operated by the player in a baseball game or golf game, it is possible to provide new games.

SUMMARY OF THE INVENTION

Therefore, a first object of the present invention is to provide an input device, game processing device and a method and recording medium for same, whereby an instrument such as a fishing rod, sword, bat, golf club, or the like can be simulated without mechanical constraints.

A second object of the present invention is to provide an input device, game processing device and a method and recording medium for same, which are suited to a fishing game in particular.

In an input device whereby a player moves the whole of the input device by holding and manipulating a portion of the casing thereof, the present invention comprises detecting means for detecting physical quantities corresponding to the movement of the input device as a whole and converting the physical quantities to a detection signal which is output, and vibration transmitting means, fixed to the casing such that vibration can be transmitted thereto, for inducing mechanical displacement corresponding to prescribed instruction signals.

Here, "physical quantity" may refer to any physical quantity such as distance, speed, acceleration, angle, angular speed, anagular acceleration, etc. Therefore, the detecting means should be capable of converting the detected physical quantities into prescribed electrical signals.

The vibration transmitting means may comprise, for example, a motor which causes a rotating axle to rotate on the basis of the instruction signal, a weight which maintains a centre of gravity at a prescribed distance from the rotating axle and is fixed rotatably to the rotating axle, and a member which fixes the motor to the casing.

The input device according to the present invention further comprises, on the portion of the casing held by the player, a trigger button which outputs the timing at which it is operated by the player as an operating signal.

The input device according to the present invention further comprises direction indicator keys which output the direction in which the player has wielded the input device as an operating signal.

The input device according to the present invention comprises, on the casing, a rod-shaped member which vibrates by a fixed amplitude or more, when vibration is transmitted to the casing by the vibration transmitting means.

The input device according to the present invention comprises a reel constructed such that the player can rotate it about a prescribed rotating axle by holding a handle, and number of revolutions output means for outputting information on the rotation of the reel in accordance with the rotation of the rotating axle.

In the input device according to the present invention, the rotating axle of the reel is provided with a ratchet wheel which rotates with the rotating axle, and an elastic hook provided on the non-rotating portion of the input device is placed adjacent to the indentations in the ratchet wheel in a position such that the hook engages with the indentations when the ratchet wheel rotates.

Here, the outer shape of the casing of the input device may be modeled on a fishing rod, for example.

Furthermore, the outer shape of the casing of the input device may be modelled on a sword.

The outer shape of the casing of the input device may also be modeled on a baseball bat.

The outer shape of the casing of the input device may also be modeled on a golf club.

In a game processing device which processes a simulated game wherein as an input device operated by a player is modeled on an instrument required for a prescribed action in real-life, the game processing device according to the present invention comprises game developing means for developing a game simulating the real-life action and providing a display indicating that the instrument has received an impact at a timing during the game corresponding to a time when the instrument would receive an impact during the real-life action; and instruction means for outputting an instruction signal to the input device indicating that the impact has been received at a timing during the game corresponding to a time when the impact would be received. When movement information indicating the movement of the input device and supplied by the input device reaches prescribed conditions, the development of the game by the game developing means is changed.

In a game processing device wherein the actions reproduced artificially by the game relate to fishing and the input device is modeled on a fishing rod, the instruction means of the game processing device according to the present invention transmits vibrations to the player indicating that there is a "bite" at the input device, by outputting the instruction signal to the input device when it is judged that there has been a "bite" in the course of the game.

In a game processing device wherein the actions reproduced artificially by the game relate to fishing and the input device is modeled on a fishing rod, in the present invention, when it is judged that there has been a "bite" in the course of the game, a fish is considered to have nibbled at the bait corresponding to this "bite" in the course of the game, if the physical quantities corresponding to the rotation of the reel of the input device and the movement of the input device as a whole display a change of or above a prescribed amount.

In the game processing device according to the present invention, if it is judged that the fish has nibbled at the bait in the course of the game and the movement of the fish has stopped, the fish is taken as being reeled in in the course of the game, if the physical quantities corresponding to the rotation of the reel of the input device and the movement of the input device as a whole display a change of or above a prescribed amount.

In the game processing device according to the present invention, if the operation of reeling in the fish in the course of the game is repeated a certain number of times or more, then the fish is taken as having been landed in the course of the game, if the physical quantities corresponding to the movement of the input device as a whole display a change of or above a prescribed amount.

In the game processing device according to the present invention, if it is judged that there has been a "bite" in the course of the game, the action carried out corresponding to the bite in the course of the game is taken as having failed, if the physical quantities corresponding to the rotation of the reel of the input device and the movement of the input device as a whole match certain conditions.

In a game processing method for processing a simulated game wherein an input device operated by a player is modeled on an instrument required for a prescribed action in real life, the game processing method according to the present invention comprises: a game developing step whereby a game simulating the real-life action is developed and a display is provided indicating that the instrument has received an impact at a timing during the game corresponding to a time when the instrument would receive an impact during the real-life action; and an instruction step whereby an instruction signal is output to the input device indicating that the impact has been received at a timing during the game corresponding to a time when the impact would be received. When movement information indicating the movement of the input device and supplied by the input device reaches prescribed conditions, the game developing step changes the development of the game by the game developing means.

In the game processing method according to the present invention, the actions reproduced artificially by the game relate to fishing, and in a game processing method wherein the input device is modeled on a fishing rod, the instruction step transmits vibrations to the player indicating that there is a "bite" at the input device, by outputting the instruction signal to the input device, when it is judged that there has been a "bite" in the course of the game.

In the game processing method according to the present invention, the actions reproduced artificially by the game relate to fishing, and in a game processing method wherein the input device is modeled on a fishing rod, when it is judged that there has been a "bite" in the course of the game, the game developing step considers that a fish has nibbled at the bait corresponding to this "bite" in the course of the game, if the physical quantities corresponding to the rotation of the reel of the input device and the movement of the input device as a whole display a change of or above a prescribed amount.

In the game processing method according to the present invention, if it is judged that the fish has nibbled at the bait in the course of the game and the movement of the fish has stopped, the fish is taken as being reeled in the course of the game, if the physical quantities corresponding to the rotation of the reel of the input device and the movement of the input device as a whole display a change of or above a prescribed amount.

In the game processing method according to the present invention, if the operation of reeling in the fish in the course of the game is repeated a certain number of times or more, then the fish is regarded as having been landed in the course of the game, if the physical quantities corresponding to movement of the input device as a whole display a change of or above a prescribed amount.

In the game processing method according to the present invention, if it is judged that there has been a "bite" in the course of the game, the actions carried out corresponding to the bite in the course of the game are taken as having failed, if the physical quantities corresponding to the rotation of the reel of the input device and the movement of the input device as a whole match certain conditions.

The recording medium according to the present invention is a mechanically readable recording medium on which programs for executing each step of the game processing method according to the present invention are stored.

Also, the recording media for the present invention are media on which information (primarily, digital data and programs) are recorded by some physical means, and which are capable of executing specified functions on computers, dedicated processors and other processing devices. In other words, this can be any media that downloads programs to a computer by some means of another, and which executes specified functions. For example, this includes floppy disks, hard disks, magnetic tape, magneto-optical disks, CD-ROM, DVD, ROM cartridges, RAM memory cartridges equipped with back-up batteries, flash memory cartridges and non-volatile RAM cartridges.

Systems that receive data transmitted by a host computer via wired or radio communications circuits (public telephone lines, dedicated data communications circuits, satellite circuits) are also included. The so-called Internet is included among the recording media referred to here.

BRIEF DESCRIPTION OF THE DRAWINGS

FIG. 10 is a functional block diagram of the present invention.

DESCRIPTION OF THE PREFERRED EMBODIMENTS

Next, preferred modes for implementing the present invention are described with reference to the drawings.
(First Mode of Implementation)
In a first mode of implementation, the present invention is applied to a fishing game.
(Composition)

Figure 1:
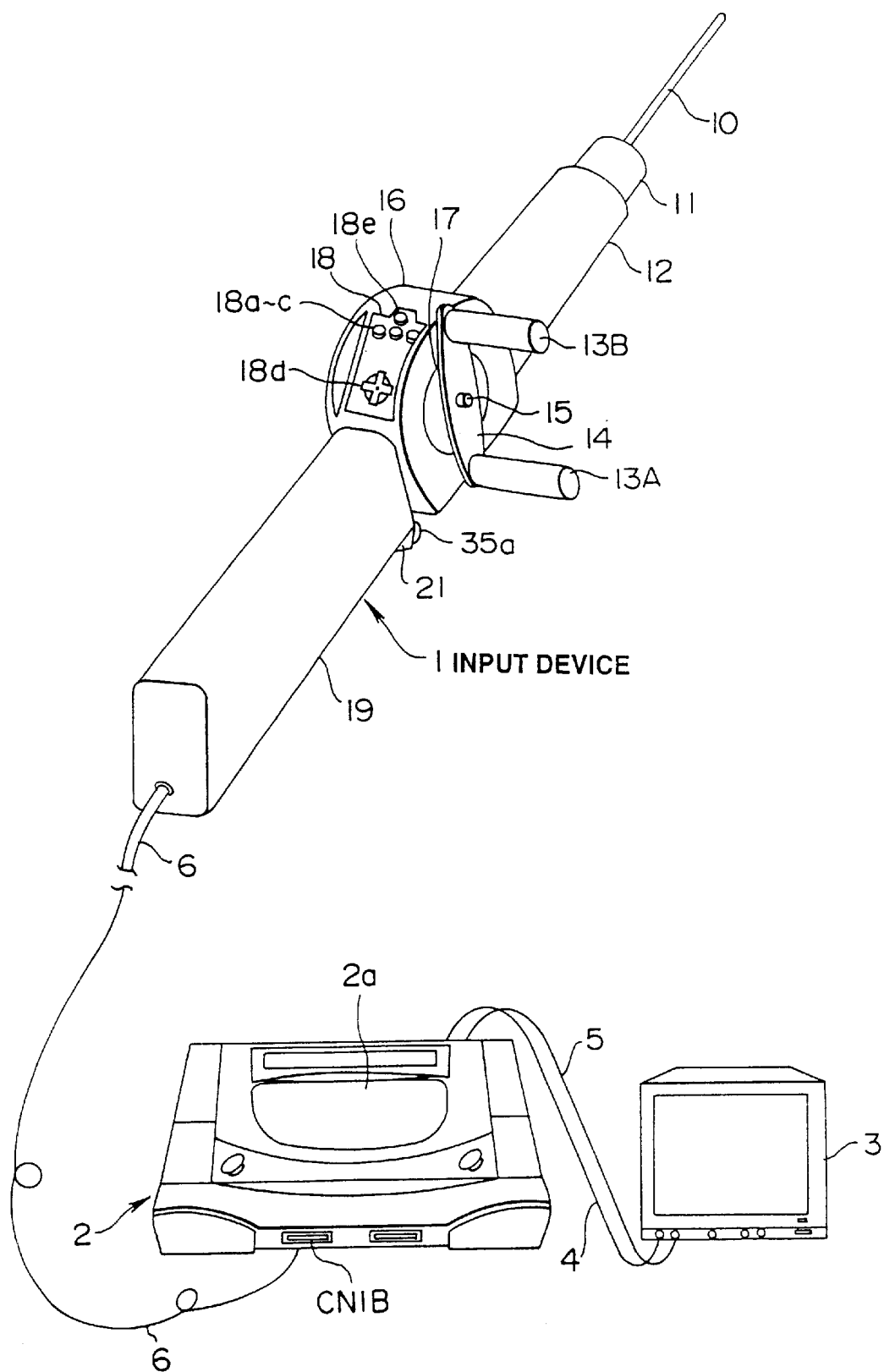
FIG. 1 is an oblique view of an input device and a game processing device according to a first mode for implementing the present invention.
Figure 2A:
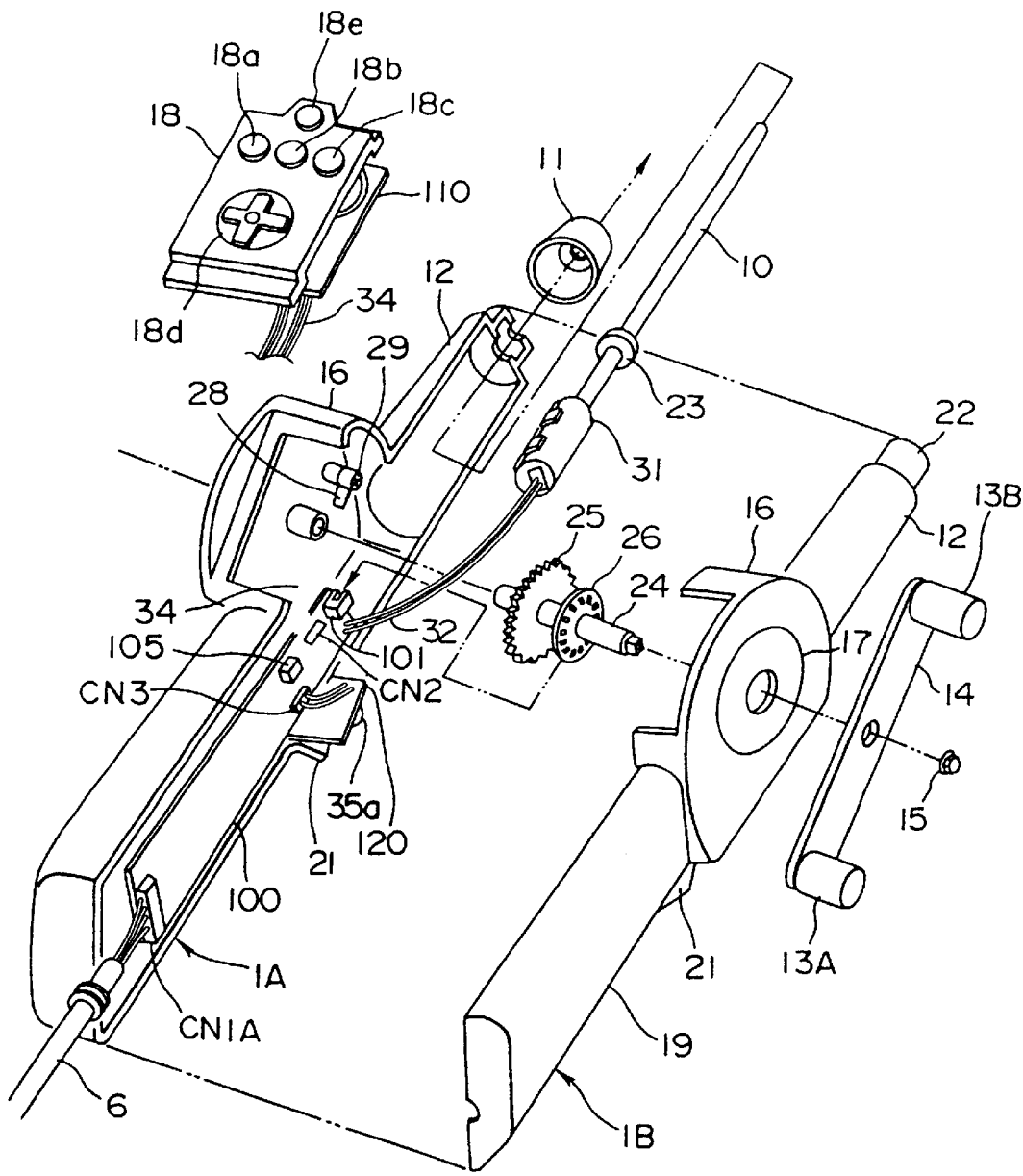
FIGS. 2a and 2b are exploded views of an input device according to a first mode for implementing the present invention.
Figure 2B:
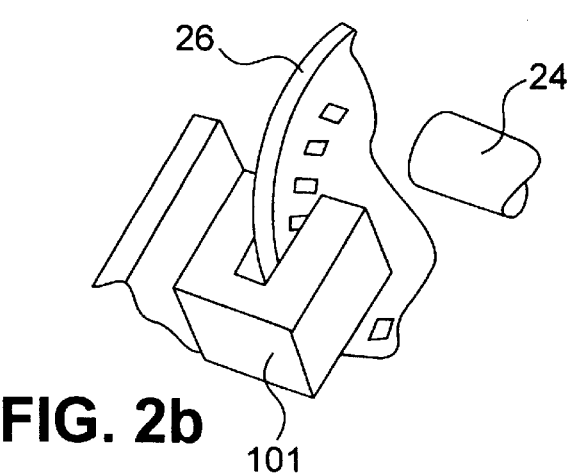
Figure 3:
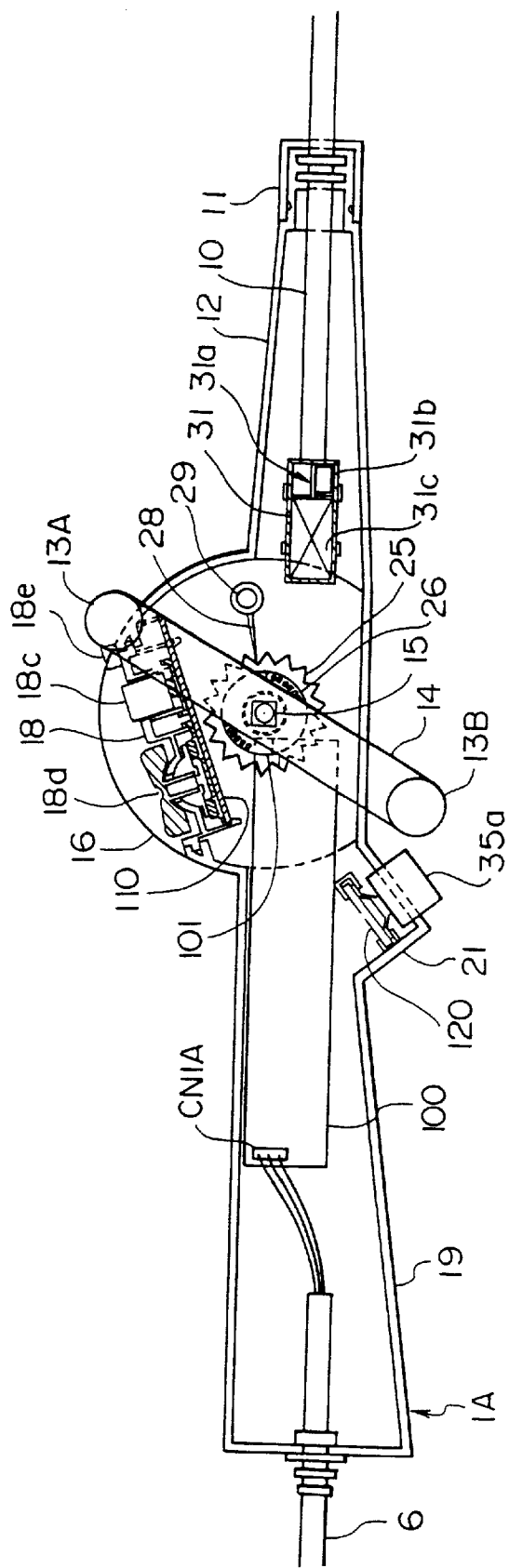
FIG. 3 is a sectional view of an input device according to a first mode for implementing the present invention.

The composition of the first mode of implementation is shown in FIG. 1–FIG. 3. FIG. 1 is an oblique view of an input device and game processing device; FIGS. 2a and 2b are exploded views of an input device; and FIG. 3 is a sectional view of the input device.

As shown in FIG. 1 and FIG. 2a, the input device 1 comprises a holding section 19, a reel section 16, an end section 12 and a rod 10. The housing section 19, reel section 16 and end section 12 form one portion of a casing, and as shown in FIG. 2a, they can be separated into half members 1A and 1B.

The holding section 19 is the part held by the player, and a trigger button 35a is provided on a projection 21 thereof. An encoding circuit 100 is housed inside the holding section 19, and a trigger button circuit 120 is housed inside the projection 21. The trigger circuit 120 is connected to the encoding circuit 100 via a connector CN3. One end of a cable 6 is connected to the encoding circuit 100 via a connector CN1A. The other end of the cable 6 is connected to a game processing device 2 via a connector CN1B. A phototransistor 101 (see FIG. 4) is located on the encoding circuit 100. This phototransistor 101 is positioned such that the slitted portion of an encoder plate 26 fixed to the rotating axle 24 of a reel section 16 passes through a detecting notch therein, as indicated in the partial enlargement in FIG. 2b.

The reel section 16 comprises reel handles 13A,B, a reel bar 14, an operating panel 18, and the like. The reel handles 13A, 13B are held by the player and used to rotate the reel. The reel handles 13A,B are fixed rotatably to the reel bar 14. The reel bar 14 is fixed to the rotating axle 24 by means of a screw 15 (see FIG. 2). The reel bar 14 is held against a truncated cone 17 which raises it above the reel bar installation surface of the reel section 16 in order to present friction between this installation surface and the reel bar 14. The operating panel 18 is provided with operating buttons 18a–18c, a direction indicator key 18d and a start button 18e. An operating button circuit 110 is provided on the rear face of the operating panel 18 and is connected via cable 34 and connector CN2 to the encoding circuit 100.

A rotating axle 24 is provided rotatably inside the reel section 16 and the reel bar 14 is fixed thereto by means of screw 15. A ratchet wheel 25 and encoder plate 26 are also fixed to this rotating axle 24. A hook 28, which is an elastic member, is fixed inside the reel section 16 by a screw 29, and as shown in FIG. 3, the end of hook 28 is positioned such that it engages with the indentations on the ratchet wheel 25.

A rod 10 base section, which is a bar-shaped member, is held in the end section 12. This rod 10 is provided with a projection 23 to prevent it being removed, which couples with the end section 12. The rod is fitted in place by inserting it through a hole provided in a cap 11 at the tip of the end section 12. An eccentric motor 31 is positioned at the end of the rod 10 such that vibrations generated by the action of this eccentric motor 31 are transmitted to the rod 10. The eccentric motor 31 is connected to an encoding circuit 100.

The game processing device 2 comprises a connector CN1B for connecting cable 6 from the input device 1, and a housing section 2 for accommodating removably a CD-ROM 9, which is the recording medium according to the present invention. The game processing device 2 supplies video signals and sound signals to a monitor device 3 via cables 4 and 5.

The eccentric motor 31 may be located in the holding section 19 or other part of the input device, rather than in the base section of the rod as described above. It may also be constructed such that. it supplies plural types of vibration and various different intensities of vibration, depending on the contents of the instruction signal for supplying vibration. For example, to change the type of vibration, the pulse waveform and pulse priod contained in the instruction signal should be changed. To change the intensity of the vibration, the amplitude of the pulses contained in the instruction signal should be changed.

Figure 4:
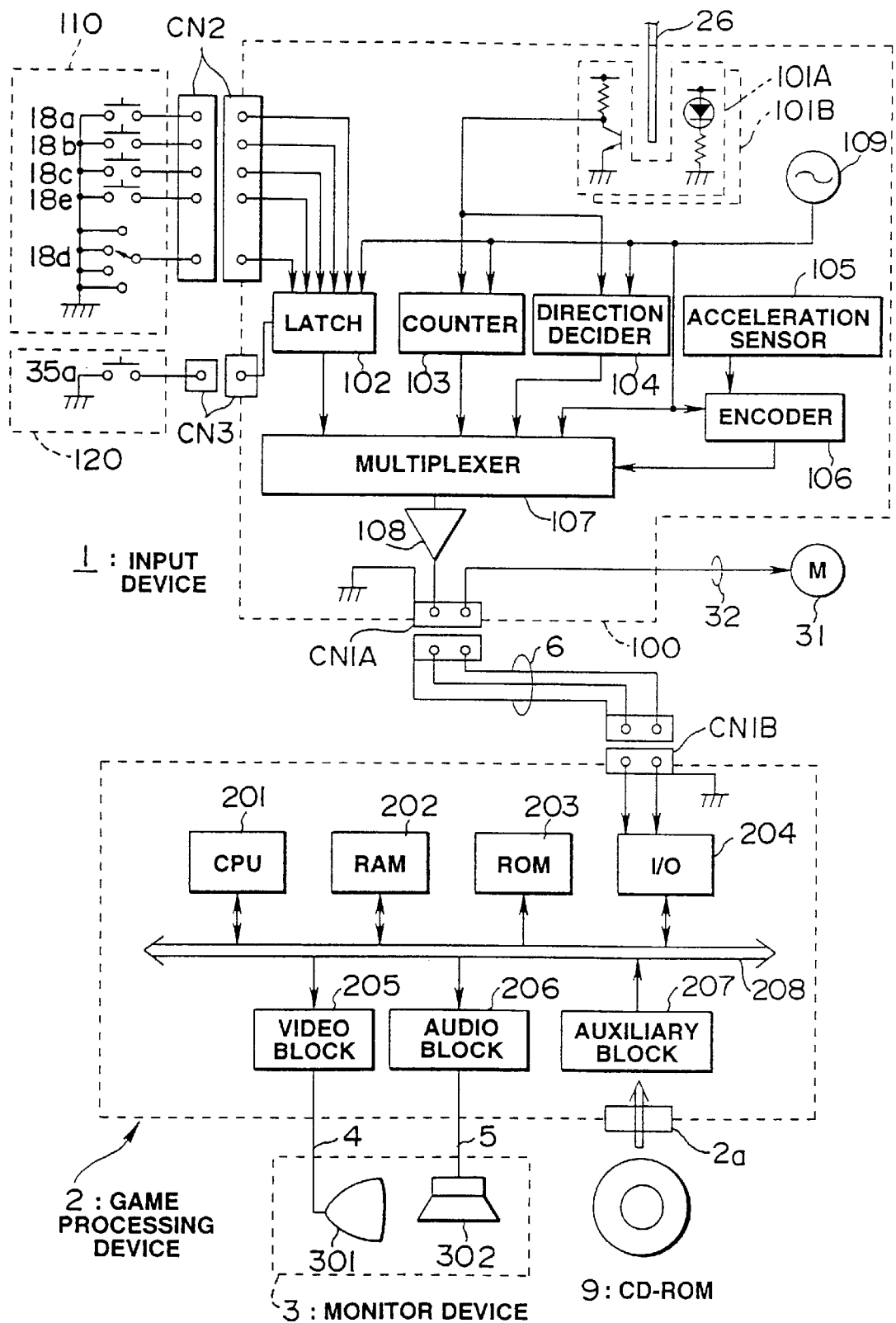
FIG. 4 is a block diagram describing electrical connections in a first mode for implementing the present invention.

Furthermore, the vibration transmitting means is not limited to an eccentric motor, and a different composition may be applied, provided that it generates mechanical displacement on the basis of an electrical signal which can be transmitted to the casing.
(Electrical Connections)
1. Input Device Side FIG. 4 is a block diagram illustrating connections between the present input device and game processing device. The electrical circuitry in the input device 1 comprises an encoding circuit 100, operating button circuit 110 and a trigger button circuit 120.

The encoding circuit 100 comprises: phototransistors 101A, B, a latch circuit 102, counter circuit 103, direction determining circuit 104, acceleration sensor 105, encoder 106, multiplexer 107, driver circuit 108 and oscillator 109.

The composition for detecting the number of revolutions of the reel is now described. The oscillator 109 supplies a reset signal to each circuit at a prescribed frequency. This frequency corresponds to the data updating cycle. Phototransistors 101A, B output detection signals corresponding to the absence or presence of slits provided on the encoder plate 26, in accordance with the rotation of the encoder plate 26. Two phototransistors are required in order to detect the direction of rotation of the encoder plate 26. The counter circuit 103 counts the number of edges of this detection signal from the input of one reset signal by the oscillator 109 until the next reset signal is supplied. The counted number of edges is proportional to the speed of rotation of the encoder plate 26. The direction determining circuit 104 detects the direction of rotation of the encoder plate 26 from the order of the detectionsignals from the two phototransistors 101A, B. Different, commonly known systems for detecting the number of revolutions may be used instead of detecting the number of revolutions by means of an encoder plate.

The composition for detecting movement of the input device 1 is described below. The acceleration sensor 105 outputs an analogue signal which is directly proportional to the acceleration acting on the input device 1. The encoder 106 converts the value of the analogue signal output by the acceleration sensor 105 when a reset signal is input from the oscillator 109 to digital data.

The acceleration sensor 105 always detects acceleration, but by selecting the program processing method for the game processing device 2, it can be set to operate as movement detecting means which detects the strength of movement, or to operate as movement detecting means which detects the orientation of the input device (the angle of elevation of the rod 10 from a horizontal position when viewed from the holding section 19, or the angle to which the input device 1 is inclined to left or right from a horizontal position). The method of changing between the two detection modes can be set and altered according to the aims of the program. For example, it may be set such that whilst the trigger button is being depressed 35a, or for a prescribed period of time after the trigger button 35a has been depressed, the strength of movement is detected, and at other times, the inclination of the input device is detected. Furthermore, it may also be set such that, if a message requesting an action, such as "please shake rod", or the like, is displayed whilst awaiting a "bite", the strength of movement is detected for a prescribed period of time after this message has been displayed, and at other times, the inclination of the input device is detected.

This clear distinction between an acceleration detection mode and an inclination detection mode is made in order to eliminate the instability arising when the system detects inclination at all times, whereby even the smallest movements made by the player holding the rod are detected and these are reflected in the game processing, leading to processing is that is not intended by the player.

Desirably, data should be detected only at the beginning and end of a movement, and the motion inbetween simulated by calculation. This is in order to reduce the data storage load, etc. on the CPU.

In the mode for detecting the strength of movement, the magnitude of the digital data output by the acceleration sensor 105 indicates the strength of centrifugal force, and this data may be treated directly as the strength of acceleration, or in other words, the strength of movement. In the mode for detecting the inclination of the input device, the value of the acceleration detected when the input device is in a horizontal position (usual holding position wherein rod is pointing forwards and reel handle is exactly horizontal) is taken as the acceleration due to gravity, the ratio between this value for acceleration due to gravity and a subsequently detected acceleration value is determined, and the angle of inclination is calculated by taking this ratio as the cosine of the angle of inclination. If the acceleration sensor has no capacity for detecting the direction of inclination, the directional indicator keys should be used to indicate whether it is inclined in a leftward or rightward direction.

Signals from the operating buttons 18a, 18b, 18c, direction indicator key 18d and start button 18e provided in the operating button circuit 110 are input to the latch circuit 102 via connector CN2. Signals from the trigger button 35a provided in the trigger button circuit 120 are input to the latch circuit 102 via connector CN3. Upon receiving a reset signal from the oscillator 109, the latch circuit 102 latches the input operational states of the operating buttons 18a, 18b, 18c, direction indicator key 18d, start button 18e, and trigger button 35a.

The multiplexer 107 latches the bit data representing operational states from the latch circuit 102, byte data representing the count value from the counter circuit 103, bit data representing the direction of rotation from the direction determining circuit 104, and byte data representing acceleration from the encoder 105, upon receiving the reset signal from the oscillator 109, and outputs this data as time-division multiplexed data. The driver circuit 108 amplifies the current of this output to a suitable level for communications, and then outputs it via connector CN1A to the game processing device 2.

The game processing device 2 supplies an instruction signal for driving the eccentric motor 31, which is supplied to the eccentric motor 31.

2. Game Processing

As shown in FIG. 4, the game processing device 2 comprises a CPU 201, RAM 202, ROM 203, interface circuit (I/O) 204, video block 205, audio block 206 and auxiliary block 207.

The CPU 201 conducts processing corresponding to the game developing means and instruction means according to the present invention, by executing game program data read from the CD-ROM 9. The RAM 202 is used to store program data and image data, and also serves as a work area for the CPU 201. The ROM 203 stores initialization programs for when the power is switched on, and image data. The interface circuit 204 outputs and inputs data to and from the input device 1. The video block 205 conducts image processing on the basis of video data transferred from the ROM 203 or CD-ROM 9, in accordance with commands from the CPU 201. The generated video signal is supplied via a cable 4 to a display 301 in the monitor device 3, where it is displayed. The audio block 206 conducts sound processing on the basis of sound data transferred from the CD-ROM 9. The generated audio signal is supplied via a cable 5 to speakers 302 in the monitor device 3, where it is reproduced as sound. The auxiliary block 207 reads out program data and image data from the CD-ROM 9 and supplies it to a bus 208. The bus 208 provides mutual connection between each of the constituent elements.

The form and configuration, etc. of the components in the input device 1 may be changed freely, regardless of the aforementioned drawings. Furthermore, instead of a dedicated game device as shown in FIG. 1, the game processing device 2 may also be a general computer.

(Action of Input Device)

The action of this input device is now described. The player holds the holding section 19 and manipulates the input device 1. The player indicates the start and end of the game by means of the start button 18e, and can determine or delete details of the game by means of the operating buttons 18a–18c. The player uses the direction indicator key 18d to select game contents and indicate the direction in which the input device 1 is operated. The details of the operating buttons are transmitted to the game processing device 2 via the latch circuit 102, multiplexer 107 and driver circuit 108.

When the player moves the input device 1, the acceleration acting on the input device 1 is detected by the acceleration sensor 105. This data is converted to digital data by the encoder 106 and then transmitted to the game processing device 2 via the multiplexer 107.

As stated previously, the data detected by the acceleration sensor 105 can be set by means of the program of the game processing device 2 such that it operates as movement detection means for detecting the strength of movement or as movement detectionmeans for detecting the inclination of the input device. Furthermore, instead of selecting between an acceleration detection mode or an inclination detection mode by means of the program, it is also possible to devise movement detection means whereby the acceleration is detected when the size of the data detected by the acceleration sensor 105, in other words, the strength of movement, is greater than the acceleration due to gravity, and the inclination is detected when the size of the data is smaller than the acceleration due to gravity.

Moreover, if the game processing device 2 gives an instruction signal, the eccentric motor 31 rotates. Since a weight 31b is attached to the rotating axle 31a of the eccentric motor 31, it has an eccentric centre of gravity, as illustrated in FIG. 3. When coil 31c rotates, the weight 31b vibrates and this vibration is transmitted to the rod 10 and end section 12 fixed to the eccentric motor 31. The vibration transmitted to the rod 10 has an amplitude corresponding to the elasticity of the end section 12 and rod 10 itself. The vibration transmitted to the end section 12 is transmitted to the holding section 19 which forms the same casing and hence it is transmitted to the player holding the holding section 19.

Furthermore, since the hook 28 engages with the indentations in the ratchet wheel 25, if the player rotates the reel 16 by holding the reel handle 13A, B, the ratchet wheel 25 rotates and the indentation pulls the hook 28. When the hook 28 is pulled, the vibrations caused by the elasticity of the hook generate a "tick-tock" clicking sound similar to that in actual reel fishing, thereby providing the player with a sense of realism.

(Description of Functional Block)

FIG. 10 shows a functional block according to the present invention. In this diagram, the whole system comprises an input device 400 and a game processing device 500.

The input device 400 comprises detecting means 401, vibration transmitting means 402 and button keys 403. The detecting means 401 corresponds to the acceleration sensor 105, and it detects movement of the input device as a whole and outputs this physical quantity as a detection signal. The vibration transmitting means 402 corresponds to the eccentric motor 31, and the like, and it generates mechanical displacement on the basis of instruction signals, which is transmitted to the player. The buttons and keys 403 correspond to the buttons 18a, b, c, e, 35a and direction indicator key 18d, and are composed such that they can output operating signals corresponding to the players' operation of the buttons.

The game processing device 500 comprises game developing means 501 and instruction means 502. The game developing means 501 corresponds to the CPU 201 and is composed such that it can implement a fishing game by executing a program stored in the recording medium 503. The game developing means 501 develops the game and displays images on a display 301 on the basis of the detecting signals input from the detecting means 401 of the input device and the operating signals supplied By the buttons and keys 403. If it is judged that there has been a "bite" in the course of the game, a signal to this effect is output to the instruction means. The instruction means 502 corresponds to the CPU 201, interface circuit 204, and the like, and is composed such that is can output instruction signals to the input device 400 on the basis of commands from the game developing means 501.

(Description of Operation)

Next, the operation of the first mode for implementing the present invention is described.

1. Overall Processing

Figure 5:
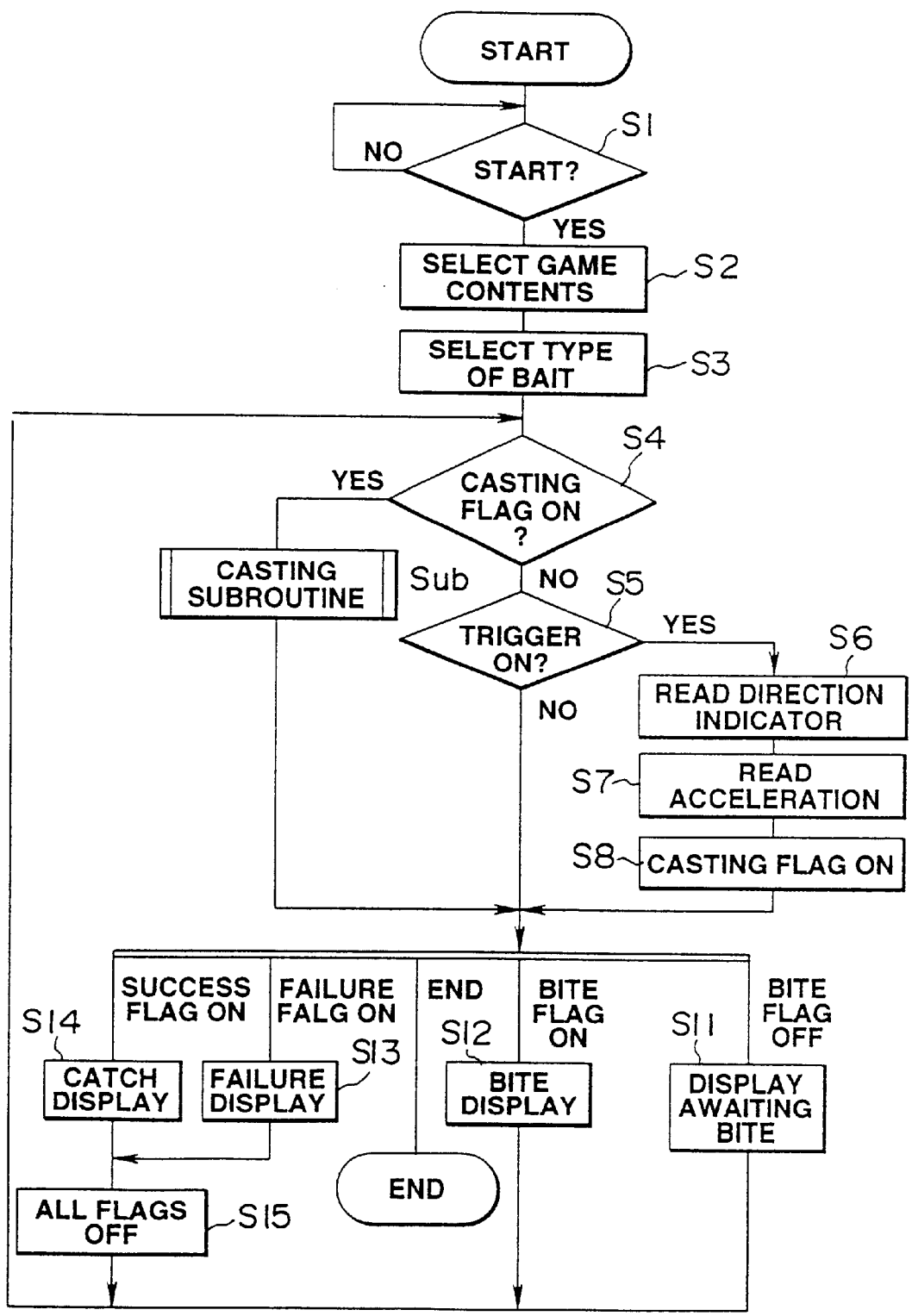
FIG. 5 is a flowchart describing overall processing according to a first mode for implementing the present invention.

FIG. 5 shows a flowchart describing the overall operation of the present mode.

Step S1: When the power is switched on, the CPU 201 reads and implements program data from the CD-ROM 9 via the auxiliary block 207. When the start button 18e of the input device 1 is pressed, the game starts (S1; YES). When the game starts, a game contents selection screen is shown on the display 301.

Step S2: The game contents selection screen suggests selections of the type of fishing, fishing gear, and other fishing conditions, etc. The player selects desired game contents by operating the direction indicator key 18d of the input device 1, and indicates his or her confirmation of the selected contents using one of the operating buttons 18a–c. The game mode can also be selected. The game mode determines whether the game will involve a normal sea fishing mode, or a fishing competition mode.

Step S3: A bait selection screen is also displayed, such that the player can select the type of bait to use, similarly to the foregoing. The type of fish to be caught can be set such that it is different for different types of bait.

When this selection has been made, the game starts. A water surface is shown on the display 301 on the basis of game program and image data read from the CD-ROM 9. Initially, the image displayed does not show a fishing rod.

In the initial state, various different flags used in the present game are reset.

Step S4: Thereupon, it is determined whether or not a casting flag indicating that the fishing rod has been cast is ON or OFF. If it is ON (S4; YES), then the casting processing described below is implemented, and if it is OFF (S4; NO), then the device advances to step S5.

Step S5: The player moves the input device 1 in the direction in which he or she wishes the fishing line to hang by an action similarly to that of casting a real fishing rod. The trigger button 35a is pressed when casting. When the trigger button 35a is pressed, this is detected by the CPU 201 (S5). If the trigger button 35a has not been pressed (S5; NO), then it is determined that the fishing rod has not yet been cast. If the trigger button 35a has been pressed, in other words, in a state where the fishing line has taken as having been cast, an image for awaiting a bite is displayed (S11) if the bite flag indicating that a fish has nibbled at the bait is OFF, and an image showing that there has-been a bite is displayed (S12) if the bite flag is ON (S12).

Instead of a casting operation, by moving the input device 1 gently, the player may also indicate a hook casting operation corresponding to gently lowering the fishing rod towards the surface of the water. In this case also, the trigger button 35a is operated similarly to the casting operation.

In FIG. 5, if the casting flag is OFF and the trigger button 35a has not been pressed, a display for awaiting a bite (S11) is shown, but since it can be assumed in this state that the player has not made any substantial action, rather than displaying an image for awaiting a bite, such as a fishing rod or a water surface, a display encouraging the player to cast the rod may also be shown.

Step S6: When the player casts the rod, he or she points the rod in the direction in which it is to be cast, presses the direction indicator key 18d, and then cast the rod. Therefore, the casting operation may involve, for example, the player moving the whole input device 1 forwards from behind him or herself, whilst pressing down the trigger button 35a with the index finger of his or her left hand and operating the direction indicator key 18d with his or her right hand. This casting operation has not been possible using a conventional input device.

Step S7: Thereupon, digital data indicating the magnitude of the acceleration during casting as detected by the acceleration sensor 105 is gathered This data indicates the strength of the rod casting action. Accordingly, the program calculates the data detected by the acceleration sensor 105 as the acceleration indicating the strength of the cast. However, the acceleration sensor 105 may also be set such that if the magnitude of the data detected by the acceleration sensor 105, namely, the data indicating the strength of the cast, is smaller than the acceleration due to gravity, then it is made to detect the inclination of the fishing rod. The fact that the strength of the cast is smaller than the acceleration due to gravity is processed as meaning that the line will hang straight down from the rod, as in so-called "bottom fishing".

In all the processing including this step, the CPU can be set freely by the program such that the data detected by the acceleration sensor 105 is treated as an acceleration indicating the strength of the cast or it can be treated as an acceleration indicating the inclination of the rod. Furthermore, the CPU can also be set freely such that the detection mode is switched depending on whether or not the data detected by the acceleration sensor is greater than the acceleration due to gravity.

Step S8: The casting flag is set to ON to indicate in the subsequent program steps that the fishing rod has been cast.

Steps S11 to S14: A corresponding image is selected and displayed according to whether or not each flag is ON or OFF. This image displays an artificial scene of sea fishing, or the like, that the person fishing might see. The series of processing steps from step S4 to step S15 is repeated in accordance with the image display timing, for instance, the vertical synchronization time. The display processes from step S11 to step S14 are selected by determining the flag states immediately prior to display. These various flags are set by the casting process (Sub) described below.

Step S11 (Display awaiting bite): If the display flag is OFF, then it is indicated that no fish has nibbled at the hook, as described below. For example, this corresponds to the stage before the rod has been cast, and to the stage where the rod has been cast (or the line has been dropped) and there has been no bite yet. In this case, a display for awaiting a bite is shown. This "display for awaiting a bite" shows the "fishing rod and the fishing line hanging down to the water surface". Here, the "fishing rod" is displayed in the casting direction read, at step S6. The water surface position of the "float attached to the fishing line" (hereafter, "water surface position" refers to the position on the water surface of a float displayed artificially in the scene,) is determined on the basis of the acceleration read at step S7. In specific terms, it is supposed that a weight of a prescribed mass is cast at the acceleration indicated by the data detected by the acceleration sensor 105 in the direction indicated by the direction indicator key 18*d,* the path of travel of this weight is calculated, its water surface position is determined, and a float is displayed in this water surface position.

Furthermore, if "bottom fishing", or the like is selected at step S7, then the inclination of the input device 1 (angle of elevation of the rod) is calculated on the basis of the data from the acceleration sensor, the water surface position of fishing line is calculated, assuming that the fishing rod has been cast at the calculated angle, And the image of a hanging line is displayed at this water surface position.

The probability of achieving a bite and the type of fish that can be caught are set such that they differ depending on this water surface position, and a display to this effect may be provided.

When the fishing rod has been cast, if the player wishes to move the position of the fishing rod to the left or right, he or she presses down the direction indicator key 18*d* in the desired direction. This is detected by the CPU 201, and the display position of the float may be moved to the left or right on the water surface, accordingly. The distance travelled (speed) of the fishing rod may also be changed according to the angle at which the input device 1 is inclined. In this case, the angle of inclination to left or right is detected by the acceleration sensor 105, the distance of travel in the left or rightward direction indicated by the direction indicator key 18*d* is determined according to the size of the angle of inclination, and a corresponding image is displayed.

After the rod has been cast, if the player slowly raises the rod 10 in the input device 1, this is detected by the acceleration sensor 105 which supplies corresponding digital data. The angle of elevation of the fishing rod is calculated on this basis, and the display position of the float shown on the screen may be moved towards the player over the water surface.

Step S12 (Bite display): If the bite flag is ON, it is indicated that a fish is nibbling at the hook, as described below. In this case, a bite display is provided. The "bite display" varies depending on how the player operates the input device 1.

For example, at the point that the fish starts to bite, the float is as displayed as rising and falling. Corresponding to this, an instruction signal is output causing the eccentric motor 31 in the input device 1 to be driven.

If the player raises the rod 10 of the input device 1, the instruction signal to the eccentric motor 31 steps and the vibration of the rod 10 also stops. If the player turns the reel handle 13 at this point, it is indicated that the fishing line has been reeled in by an amount corresponding to the number of revolutions of the reel. Therefore, the position of the float is displayed as moving towards the front of the water surface (towards the player) in accordance with this action.

In order to simulate the appearance of a real fish swimming around, the position of the float is displayed as changing with the movement of the fish, or a leaping fish is displayed.

Step S13 (Failure display): As described below, if there has been a bite but the player lowers the input device 1, or if the fish has stopped is moving but the player does not turn the reel enough times, the player's action is regarded to be unskilled and the failure flag switches ON. In this case, a failure display is shown.

The "failure display" may comprise, for example, a display indicating that the fish has escaped, along with production of a noise indicating a failure, or the like.

Step S14 (success display): As described below, once the action of raising the input device 1 and turning the reel has been carried out a prescribed number of times or more, if the input device 1 is then raised suddenly, the success flag indicating that a fish has been caught switches to ON (S37). In this case, a success display is shown.

A "success display" may involve displaying an image of a fish suddenly pulled up above the surface of the water, followed by an indication that a fish has been caught accompanied by a sound. In this case, the size and type etc. of the fish caught are displayed. The contents of this profile display can be selected by means of the direction indicator key 18*d,* or the like. If the game mode has been set to a fishing competition, then the competition rankings etc. are shown. The rankings are determined on the basis of the size and type of fish caught by the player, the amount of time taken to catch the fish, and the like. Rankings which relate to the results of past players of the game may also be displayed.

The game can be made to end if the player indicates the end of the game by means of any of the operating buttons 18*a–e* during the game, or if there is a successful or failed catch.

Furthermore, in addition to the processing described above, a database of the fish caught by the player may also be displayed. The profiles of fish that the player wishes to catch, or guidance for a competition, or the like, may also be displayed.

2. Casting Subroutine: (Sub)

If the player carries out a casting action, or the like, whilst depressing the trigger button 35*a* and the direction indicator key 18*d,* the casting flag will be set to ON at step SE. When the casting flag switches to ON, the processing follows the YES path at step S4 and a casting subroutine (Sub) is implemented.

Figure 6:
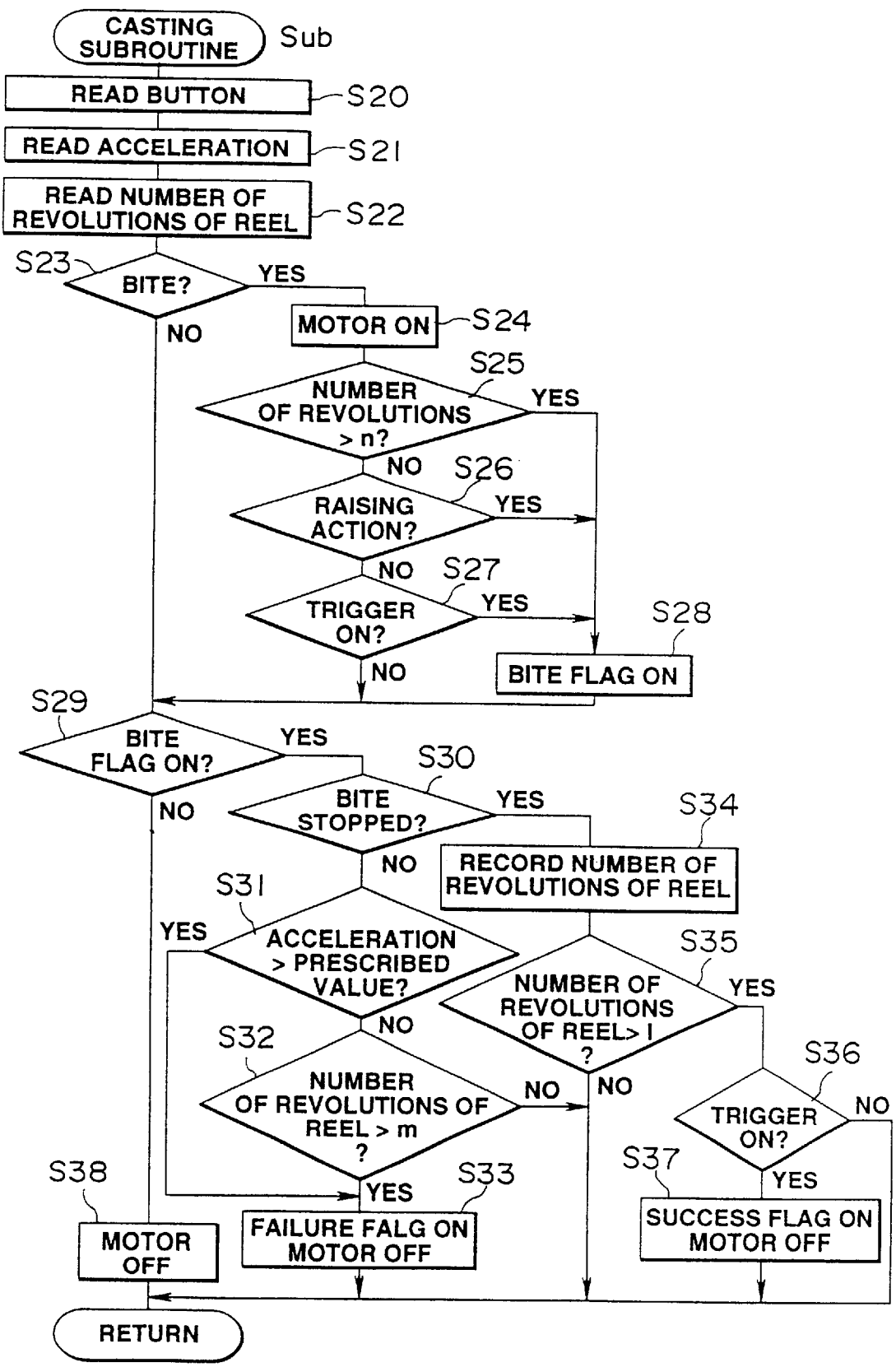
FIG. 6 is a flowchart describing a casting process according to a first mode for implementing the present invention.

FIG. 6 shows a flowchart describing the casting action according to the present mode.

step S20: In the casting subroutine, the operational states of the operating buttons and direction indicator key as transmitted by the input device 1 are read.

Step S21: Digital data from the acceleration sensor 105 is also read such that the strength of movement and the left and rightward inclination of the fishing rod are detected.

Step S22: The rotational state of the reel is also read. The "rotational state" is determined on the basis of byte data indicating the count value reached by the counter 103, and the direction of rotation is determined on the basis of bit data output from the direction determining circuit 104.

Step S23: It is determined whether or not a timing for indicating a bite on the basis of the program has been reached. The CPU 201 is able to determine that there has been a bite once a prescribed period of time has elapsed after the casting flag switches to ON. Furthermore the CPU 201 is also able to determine that there has been a bite, after a period of time corresponding to an appropriate random number specified by the CPU 201 has elapsed.

Step S24: If a timing for a bite has been reached (S23; YES), an instruction signal is transmitted to the input device 1. The eccentric motor 31 is rotated by this signal, and therefore the vibration it produces is transmitted to the rod 10 and holding section 19, so that the player can tell that a fish is biting.

The acceleration sensor 105 detects the acceleration independently, even whilst the eccentric motor 31 is rotating, so movement of the input device 1 can be detected regardless of whether or not the eccentric motor 31 is operating.

Step S25: In actual fishing, if a fish bites, then it is possible to make the fish nibble at the hook by winding up the reel. To simulate this, it is determined whether or not the number of rotations of the reel at that time is greater than a prescribed number n, and it is it greater (YES), a bite flag indicating that the fish has nibbled at the hook is switched to ON (S28).

Step S26: In actual fishing, if a fish bites, then it is also possible to make the fish nibble at the hook by raising the fishing rod, without winding up the reel. Therefore, it is determined whether or not the player has performed the action of raising the rod 10 of the input device 1 by a certain amount or more, by referring to the digital data indicating acceleration. If it has been raised by this certain amount or more (YES), the bite flag is switched to ON (528). In this process, "YES" is selected if the acceleration is over a prescribed value.

Step 527: If, in addition to determining the number of revolutions of the reel and the raising action, it is also set as a condition that the trigger button should be depressed when the rod is raised, then it is possible to confirm that the player clearly intends to raise the rod. Therefore, it is determined whether or not the trigger button 35*a* is in a depressed state. If it is depressed (YES), the bite flag is set to ON (S28). If it is not depressed (NO), no action is regarded to have occurred, and the subroutine proceeds to step S29.

Step S29: If the bite flag is ON, this indicates that a fish has nibbled at the bait, and therefore the subroutine transfers to the corresponding processing steps (S30–S37). If the bite flag is OFF, then this indicates that no fish is nibbling at the bait, and therefore an instruction signal halting the eccentric motor 31 is output (S38).

Steps S30–S37: In an actual fishing scene, if the fish is moving about wildly and the fisherman raises the rod too vigorously, or turns the reel too violently, the fishing line may break and the fish may escape. Therefore, he or she turns the reel and winds in the fish when the fish has got tired and has stopped moving. When the fish has been reeled in sufficiently by repeating this action, the fisherman raises the rod suddenly whilst turning the reel, and the fish is landed. In the processing routine described below, steps for simulating the aforementioned conditions in an actual fishing situation are followed. The eccentric motor 31 is driven in order to represent the movement of a fish. When the eccentric motor 31 is driven more intensely by means of the instruction signal, this represents a situation where the fish is moving about wildly.

If the fish has not stopped moving (S30; NO), in other words, if the eccentric motor 31 is being driven, and the digital data representing acceleration is greater than a prescribed value (S31: YES), in other words, the fishing rod (input device 1) is raised suddenly against the movement of the fish, then the failure flag switches to ON, indicating that the fishing line has broken or the fish has escaped.

If the digital data indicating acceleration is at or below the prescribed value (S31; NO), then if the number of revolutions of the reel is greater than a prescribed value m (S32; YES), this is considered to be an impossible reel winding against the movement of the fish, and the failure flag switches to ON.

If, on the other hand, the movement of the fish stops (S30; YES), in other words, the movement of the eccentric motor 31 stops, the number of revolutions of the reel wound in whilst the motor is stopped is recorded (S34). It is then investigated whether or not the total number is of revolutions of the reel is over a prescribed value 1 (S35). This is in order to determine whether or not the length of the line wound in indicates conditions where the rod can be raised, since the total number of revolutions of the reel is proportional to the length of line wound in.

If the total number of revolutions of the reel is at or below the prescribed value 1 (S35; NO), then the subroutine returns directly, whereas if it is greater than the prescribed value 1 (S35; YES), it is determined whether or not the trigger button 35*a* is in a depressed state (S36). The fact that the trigger button is depressed is taken as indicating the player's intention to raise up the fishing rod.

If the trigger button 35*a* is pressed down (S36; YES), then a success flag indicating that a fish has been caught is switched ON, and an instruction signal causing the eccentric motor 31 to step is output. If the trigger button 35*a* is not pressed down (S36; NO), the subroutine returns.

During the processing described above, a gauge indicating the magnitude of the tension in the fishing rod is shown on the display 301. The device may be set such that if this gauge reaches or exceeds a prescribed value, the game is lost. The strength of the tension pulling on the fishing line is reflected in the size of the instruction signal, and is ultimately transmitted to the player as the intensity of vibration of the eccentric motor 31. In this case, the force pulling on the fishing line can be changed continuously. If the variation in tension pulling on a fishing line can be represented in this way, it is possible to provide a realistic game, which is similar to catching a real fish.

Moreover, as well as judging whether the rod has been raised according to whether or not the trigger button 35*a* is depressed, it is also possible to judge whether the rod has been raised on the basis of the digital data representing acceleration input in response to the raising of the input device 1 or digital data representing the angle of the input device 1.

Furthermore, whilst awaiting a bite, if the action of letting out the fishing line is assigned to the operating buttons 18*a–c* or the direction indicator key 18*d*, then it is possible to implement so-called "trolling", where the line is let out whilst awaiting a bite, or an operation whereby a fish is allowed to swim out by letting out the line once there has been a bite. For example, if the up arrow on the direction indicator key 18*d* is assigned to the action of letting out the fishing line, then when this key is pressed, the fishing line is regarded as being let out whilst the key is held down, up to a maximum length of the fishing line.

As described above, according to the present first mode of implementation, since the input device is provided with an acceleration sensor, and means for detecting the number of revolutions of the reel, it is possible to provide an input device suitable for a fishing game without any mechanical constraints, such as a fishing line, or the like. Furthermore, since vibration transmitting means, such as the eccentric motor, is provided, it is possible to reproduce the sensation of a fish biting or moving about wildly, and the like, with a high degree of realism.

Furthermore, since the aforementioned game processing device conducts a game simulating the actions of actual fishing in response to the player's operation of an input device, it is possible to provide a game which is highly realistic for the player.

(Second Mode of Implementation)

The second mode for implementing the present invention provides an input device which simulates a sword used in an actual fight.

Figure 7:
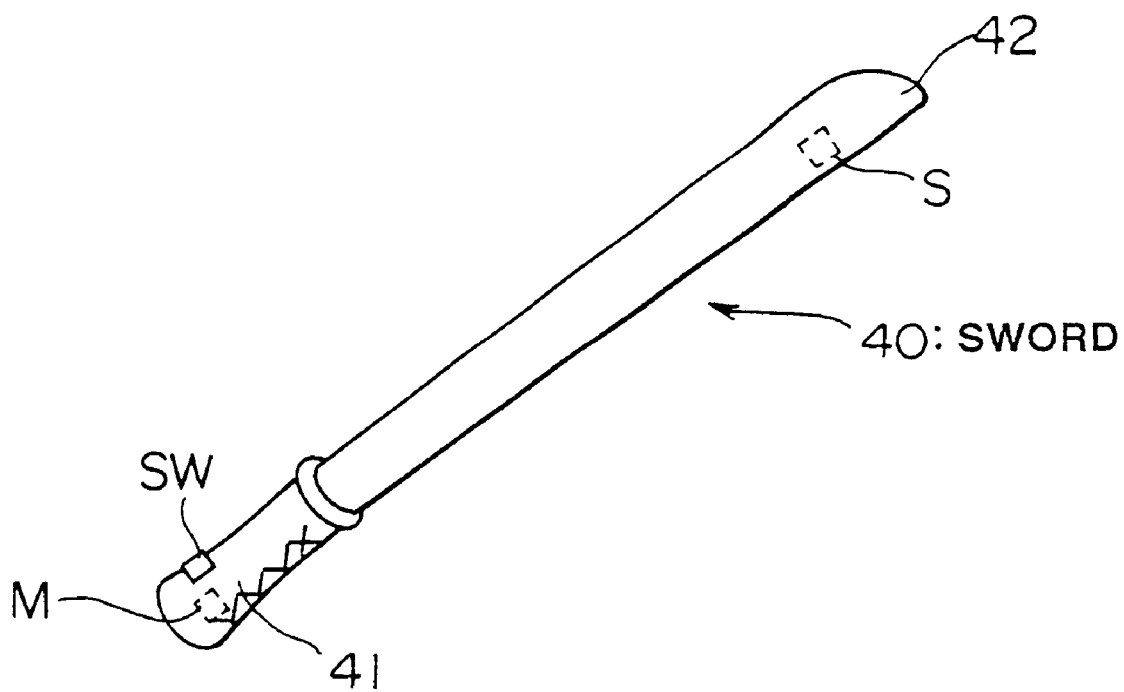
FIG. 7 is an approximate view of an input device according to a second mode for implementing the present invention.

FIG. 7 shows an approximate view of an input device according to the present mode. in this diagram, the input device (sword) 40 of the present mode comprises a holding section 41 which is held by the player and an end section 42. A trigger switch SW which the player presses at the instant of impact, for instance, when he or she brings the input device 40 downwards, and an eccentric motor M which forms vibration transmitting means for transmitting vibrations to the player, are provided in the holding section 41. An acceleration sensor S for detecting the acceleration induced in the input device 40 is provided in the end section 42.

The details of these constituent elements are the same as in the first mode of implementation described above.

A direction indicator key may also be provided to indicate the direction in which the input device is wielded, similarly to the first mode of implementation described above.

By supplying instruction signals to the eccentric motor M on the basis of detection signals from the acceleration sensor S in the input device 40 and press signals from the trigger button SW, the processing implemented using this input device should conform to the processing in the first mode of implementation. In other words, in a fighting game, the force with which a sword is wielded should be determined on the basis of detection signals from the acceleration sensor S, and the angle of the sword should be determined by detecting the acceleration due to gravity when it is being moved slowly. Furthermore, the timing for attacking an opponent should be taken as the timing at which a press signal is input from the trigger button SW. By supplying a momentary instruction signal to the eccentric motor M when the opponent is attacked, it is possible to transmit the impact of the sword cutting the opponent to the player in the form of a vibration.

According to the second mode of implementation described above, it is possible to provide an input device suitable for a fighting game device modelled on a fight, or the like.

(Third Mode for Implementing the Present Invention)

A third mode for implementing the present invention provides an input device modelled on a bat used when actually playing baseball.

Figure 8:
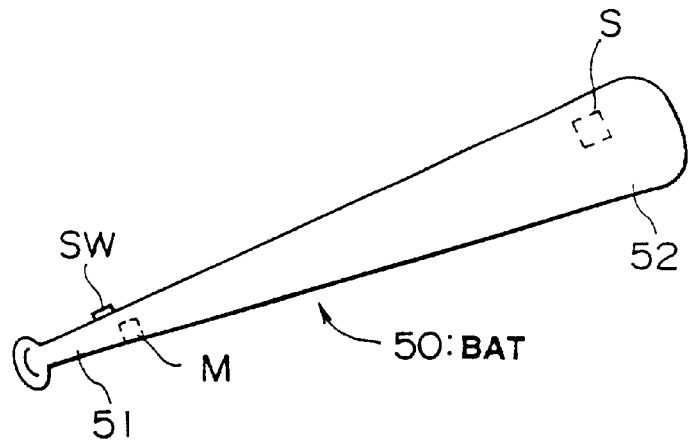
FIG. 8 is an approximate view of an input device according to a third mode for implementing the present invention.

FIG. 8 shows an approximate view of an input device according to the present mode. As shown in the diagram, the input device (bat) 50 of the present mode comprises a holding section 51 which is held by the player and an end section 52. A trigger switch SW which the player presses at the instant he or she swings the input device 50, and an eccentric motor M which forms vibration transmitting means for transmitting vibrations to the player, are provided in the holding section 51. An acceleration sensor S for detecting the acceleration induced in the input device 50 is provided in the end section 52.

The details of these constituent elements are the same as in the first mode of implementation described above.

A direction indicator key may also be provided to indicate the direction in which the input device is wielded, similarly to the first mode of implementation described above.

By supplying instruction signals to the eccentric motor M on the basis of detection signals from the acceleration sensor S in the input device 50 and press signals from the trigger button SW, the processing implemented using this input device should conform to the processing in the first mode of implementation. In other words, in a baseball game, the force of the bat swing should be determined on the basis of detection signals from the acceleration sensor S. Furthermore, the path of the swing should be determined by detecting the angle of the bat before the start of the swing and after the end of the swing, and then finding the general path of the bat by referring to a table or the like which converts these angles to a path of travel. Also, the timing of the impact of the ball should be taken as the timing at which a press signal is input from the trigger button SW. By supplying a momentary instruction signal to the eccentric motor M at the timing of the ball impact, it is possible to transmit a vibration to the player similar to the impact of a ball on the bat.

According to the third mode of implementation described above, it is possible to provide an input device suitable for a baseball game modeled on baseball.

(Fourth Mode for Implementing the Present Invention)

The fourth mode for implementing the present invention provides an input device simulating a golf club used when actually playing golf.

Figure 9:
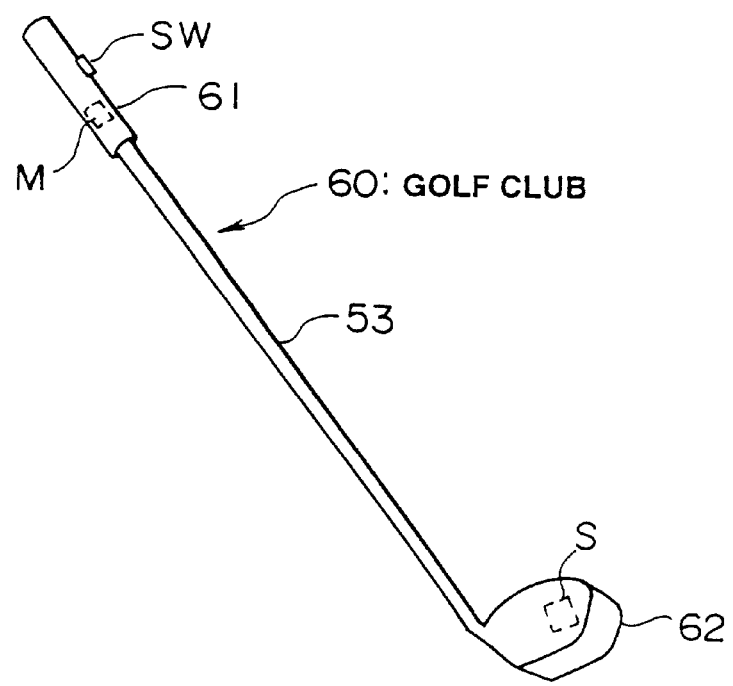
FIG. 9 is an approximate view of an input device according to a fourth mode for implementing the present invention.

FIG. 9 shows an approximate view of an input device according to the present mode. As shown in the diagram, the input device (golf club) 60 of the present mode comprises a holding section 61 which is held by the player and an end section 62. A trigger switch SW which the player presses at the instant he or she swings the input device 60, and an eccentric motor M which forms vibration transmitting means for transmitting vibrations to the player, are provided in the holding section 61. An acceleration sensor S for detecting the acceleration induced in the input device 60 is provided in the end section 62.

The details of these constituent elements are the same as in the first mode of implementation described above.

A direction indicator key may also be provided to indicate the direction so in which the input device is swung, similarly to the first mode of implementation described above.

By supplying instruction signals to the eccentric motor M on the basis of detection signals from the acceleration sensor S in the input device 60 and press signals from the trigger button SW, the processing implemented using this input device should conform to the processing in the third mode of implementation, and hence description thereof is omitted here.

According to the fourth mode of implementation described above, it is possible to provide an input device suitable for a golf game modelled on golf, or the like.

Furthermore, in the modes of implementation described above, the moment of impact was determined by the depressed state of the trigger button, but this may also be determined by means of the detection signal from the acceleration sensor alone, without using the trigger button. In other words, the player is judged to have expressed this intention if an acceleration greater than a prescribed value is detected.

(Other Modification Examples)

Furthermore, in the first mode of implementation, the direction of the cast was determined by the direction indicator keys, but this need not be used. If, for example, acceleration sensors are provided for a plurality of co-ordinate axes, then the direction of the cast can be determined by the relative magnitudes of the detection signals from each acceleration sensor.

The input device according to the present invention can be applied to a variety of applications, regardless of the aforementioned modes of implementation. For example, it may be applied to a racket for tennis, table tennis, ice hockey, or the like, and used an input device for a game simulating these sports, or it may be applied to a game such as volleyball in the form of a globe-shaped input device which the player touches with his or her hands.

Furthermore, if the input device according to the present invention is used as the control of a car or plane in a car race or fighter plane game, then the left or rightward inclination of the input device is detected by the acceleration sensor and this can be reflected in the image display and game contents. Also, if the input device according to the present invention is used as a shift lever for changing gear in a vehicle, the angle of the input device is detected by an acceleration sensor and this is reflected in the speed of the car and also in the image display and game contents based thereupon.

Moreover, the input device according to the present invention is not limited to an input device for a game device, but rather can be used for a variety of applications. For example, it can be used as in put device for a simulator, or as a sensor in a device for measuring sports abilities, or the like.

In the aforementioned mode of implementations, an acceleration sensor was used in the input device, but any detecting means capable of detecting physical quantities, such as position, velocity, angle, angular velocity, angular acceleration, etc. as parameters may be used, provided that it is capable of detecting the movement of the input device as a whole. In this case, the control circuit in the game processing device is programmed such that it can apprehend the relative movement of the input device from these detectable physical quantities.

The entire disclosure of Japanese Patent Application No. 09-17223 filed on Jan. $30^{th}$, 1997, including specification, claims, drawings and summary are incorporated herein by reference in its entirety.

Industrial Applicability

Since the present invention comprises movement detecting means for detecting the movement of the input device, it is possible to detect the movement of an input device simulating an instrument such as a fishing rod, sword, bat, golf club, or the like, without mechanical constraints.

Since the present invention comprises vibration transmitting means for transmitting vibrations to a player holding a portion of the casing, it is possible to transmit vibrations that are to be conveyed to an input device simulating an instrument such as a fishing rod, sword, bat, golf club, or the like, without mechanical constraints.

Since the present invention comprises, on a portion of the casing, a trigger button for indicating the timing at which it is operated by the player, it is possible to transmit the moment of impact within the movement of an input device simulating an instrument such as a fishing rod, sword, bat, golf club, or the like, without mechanical constraints.

Since the present invention comprises a direction indicator key for indicating the direction in which the player wields the input device, it is possible to transmit the direction in which an input device simulating an instrument such as a fishing rod, sword, bat, golf club, or the like, is operated.

Since the present invention comprises a rod-shaped member which vibrates at or above a prescribed amplitude by vibration from a vibration transmitting means being transmitted thereto, it is possible to simulate the shaking of a rod when a fish bites, and the present invention is particularly suitable for a fishing game.

Since the present invention comprises a reel which the player can rotate about a prescribed rotating axle by holding a handle, and revolution number outputting means for outputting information indicating the number of revolutions of the reel, it is possible to simulate a mechanism for winding up a reel when a fish bites, and thus the present invention is particularly suitable for a fishing game.

In the present invention, since a ratchet wheel is provided on the rotating axle of the reel and a flexible hook engages with the ratchet wheel and generates a clicking noise when the ratchet wheel is rotated, it is possible to simulate very realistically the winding noise in reel fishing when the reel is wound up when a fish bites, and the present invention is particularly suited for a fishing game.

In the present invention, the input device is modeled on an instrument required for a prescribed real-life action, a game artificially reproducing this action is implemented, a display indicating that the instrument has received an impact is shown at a timing during the game corresponding to a time when an impact would be exerted on the instrument during the real-life action, an instruction signal indicating that the instrument is to be operated is output to the input device at a timing during the game when the instrument would be operated, and when the movement information indicating the movement of the input device supplied by the input device reaches prescribed conditions, the game development by the game developing means is changed, and therefore game processing simulating fishing, sword fighting, baseball, golf, or the like, can be implemented, without mechanical constraints.

In a game processing device wherein the input device is modelled on a fishing rod, since the instruction means of the present invention outputs the instruction signal when it is judged that there has been a bite in the course of the game, and the input device transmits a vibration to the player indicating that there has been a bite in response to the instruction signal, it is possible to simulate very realistically the vibration of a fish biting in actual fishing, and therefore the present invention is particularly suited to a fishing game.

In a game processing device wherein the input device is modelled on a fishing rod, in the present invention, when it is judged that there has been a "bite" in the course of the game, a fish is considered to have nibbled at the bait corresponding to this "bite" in the course of the game, if the physical quantities corresponding to the rotation of the reel of the input device and the movement of the input device as a whole display a change of or above a prescribed amount, and therefore it is possible to simulate very realistically the movement of a fish biting and catching on the hook in actual fishing, and the present invention is particularly suited to a fishing game.

In the present invention, when it is judged that the fish has nibbled at the bait in the course of the game and the movement of the fish has stopped, the fish is taken as being reeled in in the course of the game, if the physical quantities corresponding to the rotation of the reel of the input device and the movement of the input device as a whole display a change of or above a prescribed amount, and therefore it is possible to simulate very realistically the movement of a fish being caught and reeled in in actual fishing, and the present invention is particularly suited to a fishing game.

In the present invention, if the operation of reeling in the fish in the course of the game is repeated a certain number of times or more, then the fish is taken as having been landed in the course of the game, if the physical quantities corresponding to movement of the input device as a whole display a change of or above a prescribed amount, and therefore it is possible to simulate very realistically the movement of reeling in and landing a fish in actual fishing, and the present invention is particularly suited to a fishing game.

In the present invention, if it is judged that there has been a "bite" in the course of the game, the action carried out corresponding to the bite in the course of the game is taken as having failed, if the physical quantities corresponding to the rotation of the reel of the input device and the movement of the input device as a whole match certain conditions, and therefore it is possible to simulate very realistically the movement of a fish being caught, reeled in, and then escaping whilst being landed, or the like, in actual fishing, and the present invention is particularly suited to a fishing game.

What is claimed is:

1. A game processing device which processes a simulated game wherein an input device operated by a player is modeled on an instrument required for a prescribed action in real-life, comprising:

game developing means for developing a game simulating said real-life action and providing a display indicating that said instrument has received an impact at a timing during said game corresponding to a time when said instrument would receive an impact during said real-life action;

acceleration means for measuring a magnitude of an acceleration of the input device; and instruction means for outputting an instrument signal to said input device indicating that said impact has been received at a timing during said game corresponding to a time when said impact would be received, wherein the development of the game by said developing means is changed, and said game simulates fishing, said input device is modeled on a fishing rod and reel, and said game developing means determines that a fish has escaped after a "bite" when the rod is raised with a magnitude of acceleration above an acceleration threshold or the reel is rotated above a threshold number of rotations, while the fish is moving.

2. A game processing method for processing a simulated game wherein an input device operated by a player is modeled on an instrument required for a prescribed action in real life, comprising:

a game developing step in which a game simulating said real-life action is developed and a display is provided indicating that said instrument has received an impact at a timing during said game corresponding to a time when said instrument would receive an impact during said real-life action;

an acceleration measuring step for measuring a magnitude of an acceleration of the input device; and an instruction step whereby an instruction signal is output to said input device indicating that said impact has been received at a timing during said game corresponding to a time when said impact would be received, wherein said game developing step changes the development of the game, and said game simulates fishing, said input device is modeled on a fishing rod and reel, and said game developing step determines that a fish has escaped after a "bite" when the rod is raised with a magnitude of acceleration above an acceleration threshold or the reel is rotated above a threshold number of rotations, while the fish is moving.

3. A mechanically readable recording medium on which programs for executing the steps according to claim 2 in a computer are stored.

4. A game processing device which processes a game simulating fishing wherein an input device operated by a player is modeled on a fishing rod and reel, comprising:

game developing means for developing the game simulating fishing and providing a display indicating that said rod has received an impact at a timing during said game corresponding to a time when said rod would receive an impact during said real-life action;

and instruction means for outputting an instruction signal to said input device indicating that said impact has been received at a timing during said game corresponding to a time when said impact would be received; wherein when it is determined that there has been a bite in the course of the game, said game developing means determines that a fish nibbled at a bait when the reel is rotated at least a first threshold number of rotations or the rod is raised with a magnitude of acceleration exceeding a first threshold acceleration, after the "bite";

said game developing means determines that the fish is partially reeled in when the reel is rotated at least a second threshold number of rotations, after the fish has nibbled at the bait and while the fish is not moving;

said game developing means determines that the fish is landed when the fish is repeatedly partially reeled in and the rod is raised by at least a threshold distance; and said game developing means determines that the fish has escaped after a "bite" when the rod is raised with a magnitude of acceleration above an acceleration threshold or the reel is rotated above a threshold number of rotations, while the fish is moving; and said instruction means transmits vibrations to the player indicating that there is a "bite" at said input device, by outputting said instruction signal to said input device when it is judged that there has been a "bite" in the course of the game.

5. An input device for use with a game processing device that simulates fishing, wherein the input device is operable by a player, comprising:

an instrument modeled on a fishing rod and reel;

wherein the game processing device includes game developing means for developing a game simulating fishing and providing a display indicating that said fishing rod and reel have received an impact at a timing during said game corresponding to a time when said fishing rod and reel would receive an impact during the fishing, said game developing means determines that a fish has escaped after a "bite" when the rod is raised with a magnitude of acceleration above an acceleration threshold or the reel is rotated above a threshold number of rotations, while the fish is moving;

acceleration means for measuring a magnitude of an acceleration of the fishing rod; and instruction means for outputting an instruction signal to said input device indicating that said impact has been received at a timing during said game corresponding to a time when said impact would be received, wherein the development of the game by said developing means is changed.

6. A method of operating an input device with a game that simulates fishing, wherein the input device is operable by a player, comprising:

providing the input device as a fishing rod and reel;

developing a game simulating fishing;

providing a display indicating that said fishing rod and reel have received an impact at a timing during said fishing game corresponding to a time when said fishing rod and reel would receive an impact during the fishing;

measuring a magnitude of an acceleration of the fishing rod; and outputting an instruction signal to said fishing rod and reel indicating that said impact has been received at a timing during said game corresponding to a time when said impact would be received; and determining that a fish has escaped after a "bite" when the rod is raised with a magnitude of acceleration above an acceleration threshold or the reel is rotated above a threshold number of rotations, while the fish is moving.

* * * * *